June 30, 1925. Re. 16,102

S. HEATH

ADJUSTABLE AND REVERSIBLE PROPELLER

Original Filed Dec. 4, 1919 5 Sheets-Sheet 1

Inventor

Spencer Heath,

By Watson, Coit, Moore & Grindle,

Attorney

June 30, 1925. Re. 16,102

S. HEATH

ADJUSTABLE AND REVERSIBLE PROPELLER

Original Filed Dec. 4, 1919 5 Sheets-Sheet 2

Inventor

Spencer Heath,

By Watson, Cook, Morse + Lindley,

Attorney

June 30, 1925. Re. 16,102

S. HEATH

ADJUSTABLE AND REVERSIBLE PROPELLER

Original Filed Dec. 4, 1919 5 Sheets-Sheet 3

Inventor

Spencer Heath,

By Watson, Coit, Moore & Lindle,

Attorney

June 30, 1925. Re. 16,102

S. HEATH

ADJUSTABLE AND REVERSIBLE PROPELLER

Original Filed Dec. 4, 1919 5 Sheets-Sheet 4

Inventor

Spencer Heath,

By Watson, Coit, Moore & Grindle,

Attorney

June 30, 1925. Re. 16,102

S. HEATH

ADJUSTABLE AND REVERSIBLE PROPELLER

Original Filed Dec. 4, 1919 5 Sheets-Sheet 5

Inventor

Spencer Heath,

By Watson, Cole, Grindle & Watson

Attorney

Reissued June 30, 1925. Re. 16,102

UNITED STATES PATENT OFFICE.

SPENCER HEATH, OF BALTIMORE, MARYLAND.

ADJUSTABLE AND REVERSIBLE PROPELLER.

Original No. 1,447,080, dated February 27, 1923, Serial No. 342,370, filed December 4, 1919. Application for reissue filed February 26, 1925. Serial No. 11,893.

*To all whom it may concern:*

Be it known that I, SPENCER HEATH, a citizen of the United States, residing at Baltimore, State of Maryland, have invented certain new and useful Improvements in Adjustable and Reversible Propellers, of which the following is a specification.

This invention relates to screw propellers, more particularly to propellers for aircraft, and to that type or class of propellers in which the blades are capable of simultaneous adjustment about their several longitudinal axes in such manner that the pitch of the blades can be varied at will or the action of the blades entirely reversed to any desired degree, all during continuous operation of the propeller either at rest or in flight.

The present invention is of a similar nature to that covered by my copending application Serial No. 308,112, filed July 2, 1919, and its objects are generally the same. Among the features which it comprises, in common with such prior invention are, that the blades are adjusted by engine power delivered to the propeller, manual or bodily force being required only for connecting and disconnecting the operating power; and that there are no operative connections, such as clutch collars, running bearings, or the like, normally in engagement, such connections being established only momentarily during changes in adjustment of the blades.

While the apparatus of my said prior invention is satisfactory for small or medium sized propellers, it has been found somewhat heavy for the larger sizes. A specific object of the present invention, therefore, is to provide a lighter and more compact construction. To this end, I have devised new and simplified operating mechanism, such mechanism including a smaller number of gears, and an improved duplex worm drive for adjusting the blades, and securely locking them in any position.

A further object of this invention is to provide a new and improved bearing mechanism to permit rotation of the blades, this mechanism being of the turntable type to avoid the use of long sleeves or sockets for reception of the blades, and thus reduce the weight of the parts.

Another object is to provide a means and method to secure attachment between the several blades and their sockets or ferrules which engage the bearing mechanism.

With the foregoing and other objects in view I have invented the improved mechanism more particularly described hereinafter, and illustrated by means of the accompanying drawings, which are a part of this specification, and in which.

The parts are designated by corresponding numerals throughout the several views.

Figure 1:
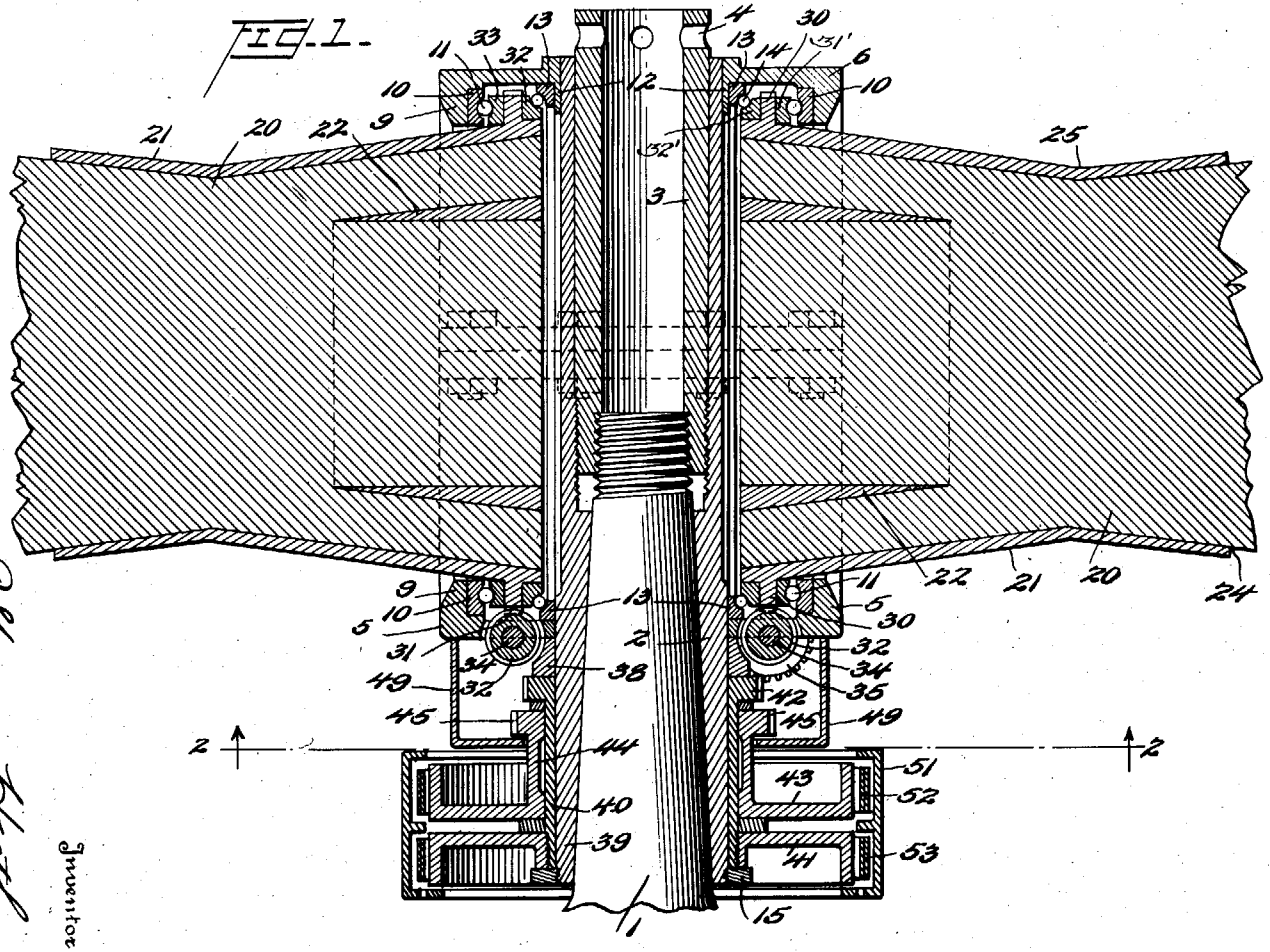
Fig. 1 is a longitudinal section coincident with the axes of both blades and the shaft.
Figure 2:
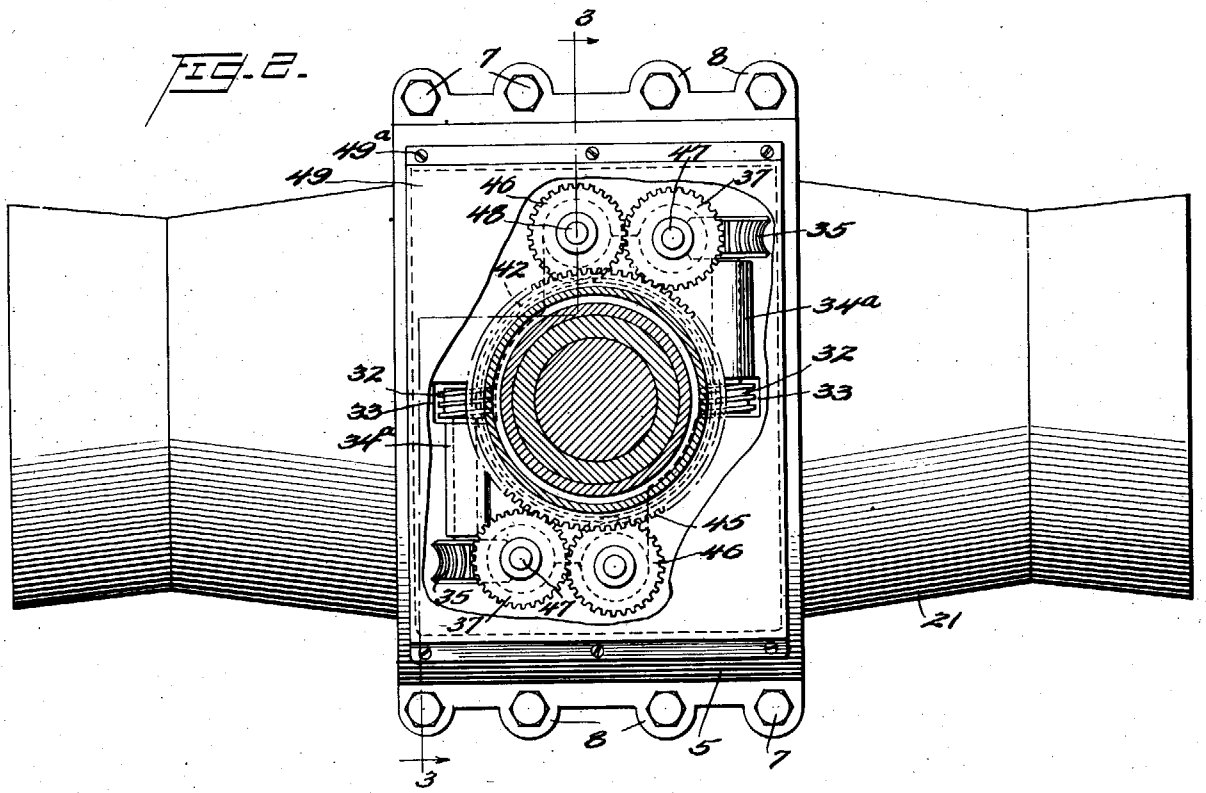
Fig. 2 is a section on line 2—2 of Fig. 1, part of the gear casing being broken away.

Referring to the drawings:

1 is the power delivery shaft on and with which the propeller as a whole revolves, and which is secured in the tapered bore of the propeller hub 2 by means of the differential nut 3 which is sufficiently extended in length to protrude slightly beyond the end of hub 2 at which protruding end the nut is provided with holes 4 for reception of a bar to turn the nut.

The hub is provided with a cylindrical portion one-half 5 of which is keyed or welded securely to the hub and the other half 6 of which is removably mounted on the outer end of the hub and secured to the part 5 by bolts 7 engaging flanges 8 on parts 5 and 6. The parts 5 and 6 are so shaped as to form a shallow socket for the reception of the inner ends of the blades as hereinafter described.

The exterior of the cylindrical portion formed by the union of parts 5 and 6 is of even contour except for the bolt flanges 8; its interior, however, is provided with circular flanges 9 and 12 for reception of ball races 10 and 13 carrying the bearing balls 11 and 14.

Figure 8:
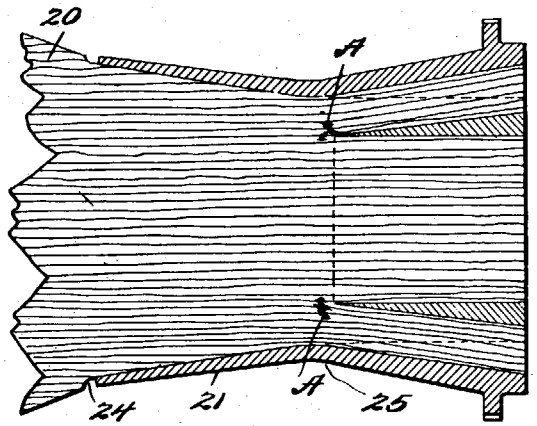
Fig. 8 is a longitudinal section through a ferrule and blade shank as hitherto made.

The blades of the propeller are illustrated two in number but a greater number of blades may be used by the addition of similar corresponding parts. The blades are preferably of wood, but other materials may be used. The shanks of the blades 20 are secured in ferrules 21, which are of double tapered form, with a constricted central portion 25, as shown in Fig. 1. The shanks are forced into the ferrules under heavy pressure and the ends of the blade shanks are then expanded to fill up the flaring inner ends of the ferrules. Hitherto the expanding of the shanks has been accomplished solely by means of wedges. It has been the practice to make the ends of the shanks cylindrical in form and but little, if any, larger than the smallest portion of the ferrule, as indicated by dotted lines in Fig. 8, and to use a ring wedge 22 concentric with the ferrule to expand the shank. This expansion, by increasing the circumference of the shank, caused radial openings into which were inserted wedges 23. The expansion of the shank by ring wedge 22 caused an outward bending of the wood, with consequent rupture or stress of its fibres at and beyond the toe of the wedge in the small portion of the ferrule, as shown at A in Fig. 8.

In order to avoid this difficulty, I have devised an improved method of securing the shanks in the ferrules.

Figure 11:
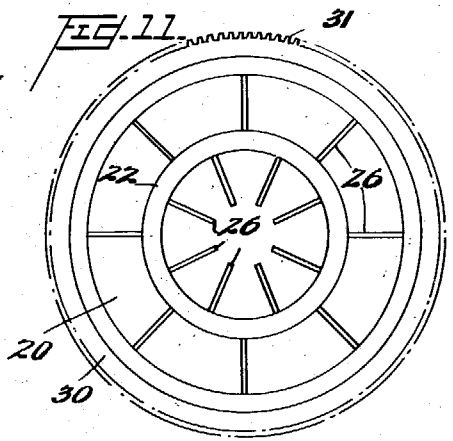
Fig. 11 is an end view of Fig. 10.
Figure 10:
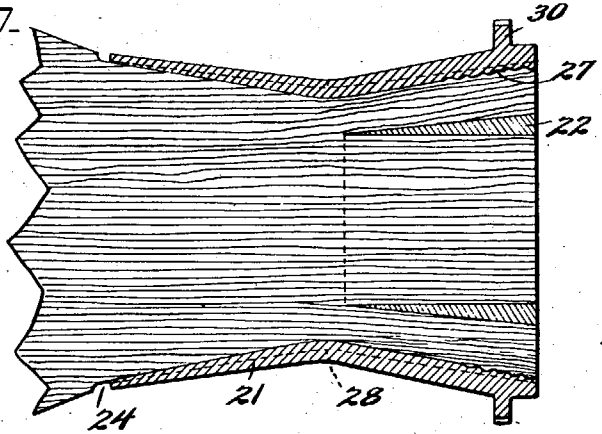
Fig. 10 is a longitudinal section through a ferrule and blade shank in accordance with the present invention.

In my improved method, the shank is first prepared with a double tapered form corresponding with the interior of the ferrule. At the entrance to the ferrule, at 24, (see Figs. 8 to 11) the shank is made but slightly larger than the interior of the ferrule. At the throat or smallest diameter of the ferrule as at 25, the shank is made one-quarter to one-half inch larger in diameter than the interior of the ferrule. At the inner end of the ferrule the butt of the shank is made equal or nearly equal in diameter to the inside of the ferrule. The contour of the blade shank before it is inserted in the ferrule is indicated by the dotted lines 28 in Fig. 10. In order to insert the shank it is necessary to reduce its end diameters to that of the restricted portion of the ferrule by compressing the wood. This is accomplished without injury to the parts by coating the shank and ferrule with lead pigment and varnish and imparting a slow rotary motion to the shank while being pressed into the ferrule. By this rotary motion between the parts it is possible to cause a great compression of the wood without requiring very heavy or injurious end pressure to insert the shank. After being inserted, the compressed end of the shank slowly expands to fill up the flaring inner end of the ferrule. This expansion may be hastened or completed by the application of moisture. The circular wedge 22 is now inserted in the butt of the shank for the purpose of compressing the wood against the inner walls of the ferrule. This is accomplished without causing radial openings in the wood and without undue bending or rupture of the fibres at the toe of the circular wedge, for the reason that there is practically no bending due to the wedge. In practice I find it advantageous to insert additional wedges 26, preferably in a radial arrangement both outside and inside of the circular wedge, as shown by Fig. 11, for the purpose of further compressing the wood in the butt end of the shank.

To facilitate insertion of the wood shank the inner walls of the ferrule are made for the most part smooth. This smoothness extends from the entrance end 24 for a distance slightly beyond the throat 25 from which point the inner surface is made rough or slightly serrated or corrugated as indicated at 27 in Fig. 10. This is for the purpose of increasing the security of engagement between the shank and ferrule.

The inner end of ferrule 21 for each blade is provided with a flange 30. On one side of this flange is seated a ball race 31′ to coact with race 10 while the other side carries a race 32′ coacting with race 13. The balls 11 form a simple end thrust bearing and the balls 14 afford a combined end thrust and radial bearing whose function is to preserve concentricity of all the parts and also to take any end thrust that might be caused in case of extreme air pressure causing a large bending moment on the blades.

The entire periphery of flange 30 on each ferrule is provided with worm-gear teeth 31 to engage the worms 32 mounted on the exterior of the hub eccentrically of the shaft 1 and engaging through the apertures 33. Worms 32 are driven through shafts 34 by worm gears 35 which in turn are driven by worms 36 each of which is integral with its pinion gear 37.

The portion of the hub 2 containing the taper bore for the shaft has an inner extension 39 upon which is journaled a sleeve 40 carrying on one end a brake wheel 41 and on its other end the spur gear 42. The sleeve 40 is held in position on the hub by means of the nut 15 threaded on the extension 39 of hub 2. Between brake wheel 41 and spur gear 42 the sleeve 40 carries, journaled upon it, a second brake-wheel 43 carrying upon its hub extension 44 a spur gear 45 adjacent to and somewhat larger than spur gear 42 on sleeve 40. Gear 45 meshes directly into the two pinions 37. Gear 42 meshes into a pair of idlers 46 which idler gears in turn mesh with pinions 37. It is thus seen that relative rotary motion between either brake wheel and the propeller hub would communicate motion to pinions 37, and pinions 37 would in turn communicate a reverse motion to the other brake wheel. From this it becomes clear that, for a given direction of relative turning of the brake wheels, either forward or reverse motion of pinions 37 may be obtained according as one or other of the brake wheels is turned in the given direction, and pinions 37 communicate this optional motion through worms 36, worm gears 35 and worms 32 to the respective blades. The worms 36, worm wheels 35, worms 32 and worm wheels 30 constitute two separate sets of worms and worm wheels for each blade. It will be seen that the gear mechanism for rotating the wheels 30 is positioned rearwardly of the propeller blades, and this term "rearwardly" should be understood as meaning that such gear mechanism is between the plane of the axes of the blades and the source of power for the shaft 1, regardless of whether the propeller is of the pulling or pushing type.

Figure 3:
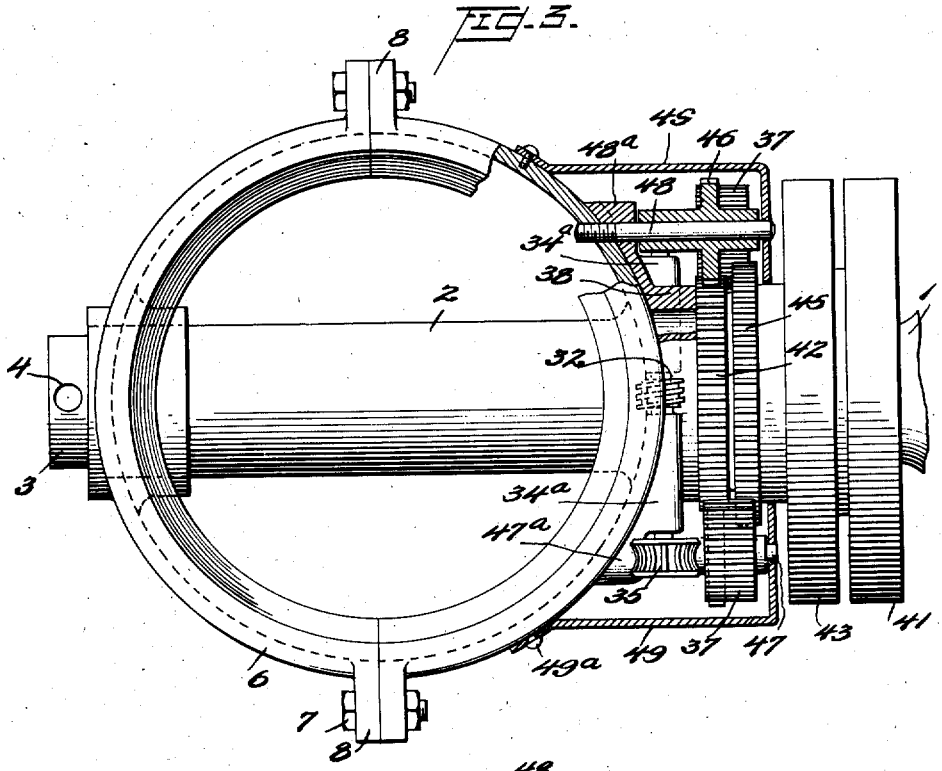
Fig. 3 is an end view of Figs. 1 and 2 shown partly in section through line 3—3 of Fig. 2.
Figure 4:
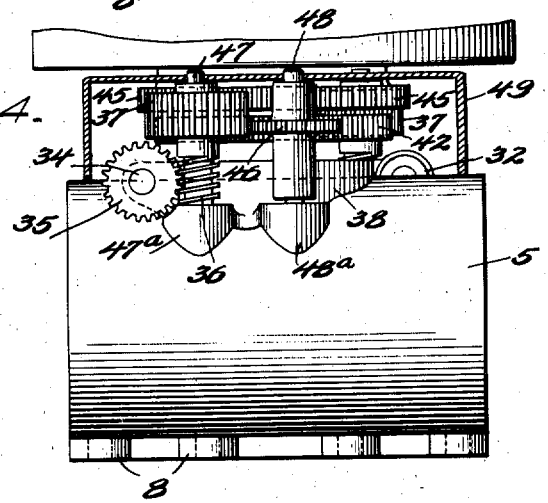
Fig. 4 is a fragmentary side view of Figs. 2 and 3, the gear casing being in section.

For convenience in mounting the idlers 46, pinions 37 and their associated worms and gears, I provide an assembly ring 38 fitting closely around the hub 2 and against the cylindrical portion 5. This assembly ring carries two long bosses 34ᵃ to provide journal bearings or shafts 34; also two bosses 47ᵃ for support of studs 47 on which are journaled pinions 37, and also two bosses 48ᵃ to support the idler studs 48. The assembly ring is secured firmly in position by the studs 47 and 48 being extended through their bosses on the ring and screwed firmly into the body of the hub below. As a further security, the opposite ends of the studs are held in position by the casing and gear housing 49 which is provided with holes to receive the ends of the studs and support them as shown in Figs. 3 and 4. The housing 49 is flanged where it attaches to the cylindrical portion 5 of the hub and is secured thereto by screws 49ᵃ.

I will now describe my means of producing relative motion between either of the two brake wheels 41 and 43 and the propeller hub.

Figure 6:
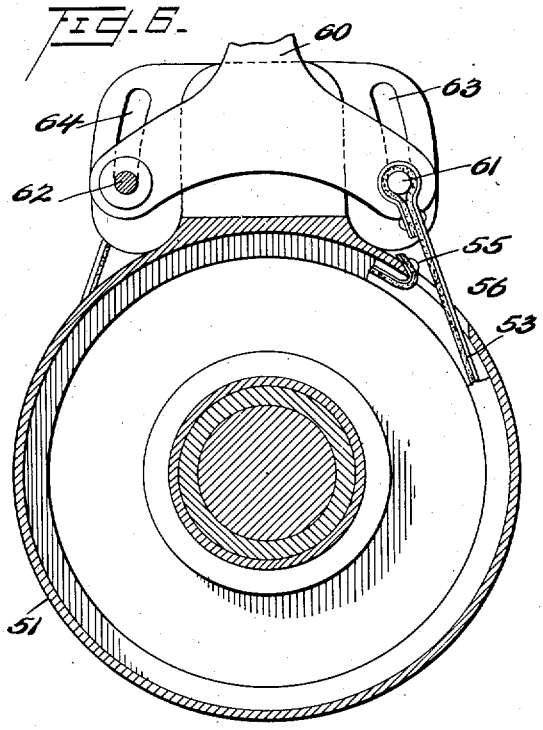
Fig. 6 is a section on line 6—6 of Fig. 5.
Figure 7:
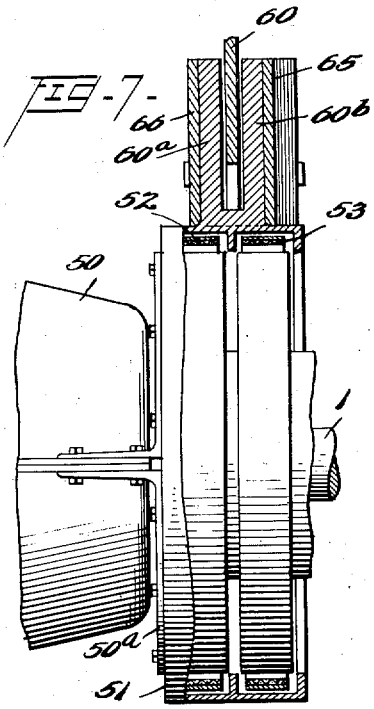
Fig. 7 is a section on line 7—7 of Fig. 5.
Figure 5:
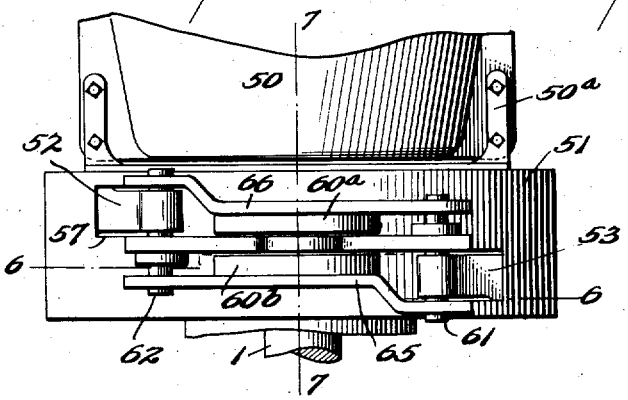
Fig. 5 is a plan view of brake housing and control lever.
Figure 12:
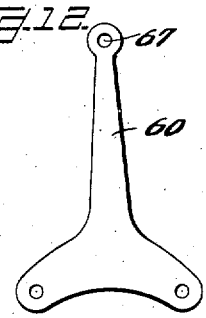
Fig. 12 is a side view of the operating lever detached.
Figure 9:
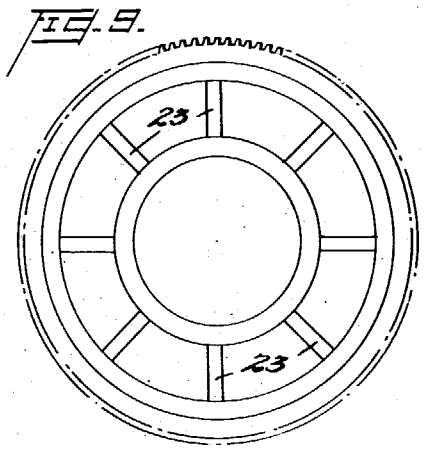
Fig. 9 is an end view of Fig. 8.

The crank case 50 (or other fixed structure from which the shaft 1 protrudes) has secured to it by brackets 50ᵃ the brake band housing 51 which provides two annular recesses for leather lined brake bands 52 and 53. Each band 52 and 53 is secured at one end to the housing 51 as shown at 55 in Fig. 6, from which point they lie closely around in their recesses in circular form with their free ends protruding from the housing through apertures 56 and 57. On the periphery of the housing and between the apertures mentioned there is mounted an operating lever 60 having alternative fulcrums on pivots in pins or studs 61 and 62 which are firmly inserted in the lever and which rest at the bottom of double slots 63 and 64 formed in plates 65 and 66, and are held there by the "spring" of bands 52 and 53, whose free ends are connected with studs 61 and 62. The plates 65 and 66 are firmly secured to lugs 60ᵃ and 60ᵇ carried by the housing 51, with sufficient space between them to receive the thickness of the lever 60. The lever is operated from its upper end by means of any suitable rod or mechanism engaging the eye 67 (Fig. 12) and capable of thrusting the lever in either direction at the operator's will. When the lever is moved to the right the stud 61 remains in the bottom of slots 63 while stud 62 moves towards the top of slot 64 and thus tightens the brake band 52. Similarly, a movement of lever 60 to the left tightens brake band 53.

The position of the brake housing 51 relative to the propeller shaft is such that when the propeller is mounted the brake wheels 41 and 43 will be in position to be engaged by the bands 53 and 52 respectively, whenever either of these bands shall be contracted by operation of lever 60.

The propeller being mounted and in operation, the adjusting or reversing of the blades is accomplished by thrusting lever 60 momentarily in one direction or the other, according to the effect desired. The gripping of one of the brake wheels causes relative motion between it and the revolving propeller, thus setting the various gears in motion and adjusting the blades.

Having thus described the invention, what is claimed as new and desired to be secured by Letters Patent is:

1. A propeller comprising a hub, a plurality of ferrules rotatably mounted therein, a blade secured in each ferrule, and thrust bearings between each ferrule and the hub for resisting both inward and outward radial movement of the blades relative to the hub, the major portion of each of said ferrules lying radially beyond and substantially outside of said hub.

2. A propeller comprising a hub, a plurality of ferrules rotatably mounted therein, a blade secured in each ferrule, a radial annular flange carried by each ferrule substantially at its inner end, and thrust bearings between said flange and hub, said ferrules having the major portion thereof projecting outside of said hub.

3. A propeller comprising a hub, a plurality of ferrules rotatably mounted therein, a blade secured in each ferrule, a radial integral annular flange carried by each ferrule adjacent its inner end, and anti-friction thrust bearings on both sides of said flange, between the flange and hub.

4. A propeller comprising a hub, a plurality of ferrules rotatably mounted therein, a blade secured in each ferrule, a radial annular flange carried by each ferrule, gear teeth formed on the periphery of said flange, and means engaging said teeth for rotating the blades on their axes.

5. A propeller comprising a hub, a plurality of ferrules rotatably mounted therein, a blade secured in each ferrule, a complete gear wheel carried by each ferrule, and a second gear engaging each of said wheels for rotating the blades on their axes, said last named gears being arranged rearwardly of the axes of said blades.

6. An aircraft propeller comprising a shaft, a hub mounted thereon, a plurality of ferrules rotatably mounted in said hub, a blade secured in each ferrule, a worm wheel carried by each ferrule, a worm engaging each worm wheel, said worms being arranged eccentrically of said shaft and rearwardly of the axes of said blades, and means for rotating said worms to adjust the blades on their axes.

7. A propeller comprising a hub, a plurality of blades mounted therein so as to be capable of rotation on their own axes, and means for so rotating said blades, such means comprising two separate sets of worms and worm wheels for each blade, arranged in series.

8. A propeller comprising a hub, a plurality of blades mounted therein so as to be capable of rotation on their own axes, and means for so rotating said blades, such means comprising a gear, a pinion for each blade meshing with said gear, and gearing comprising two sets of worms and worm wheels between each pinion and its corresponding blade.

9. A propeller comprising a hub, a shaft to which the hub is secured, a plurality of blades mounted therein so as to be capable of rotation on their own axes, and means for so rotating said blades, such means comprising a gear concentric with and surrounding said shaft, a plurality of pinions, one for each blade, meshing with said gear, and gearing comprising a worm and worm wheel between each pinion and its corresponding blade.

10. A propeller comprising a hub, a plurality of blades, carried thereby, and mounted for rotation on their own axes, and means for so rotating said blades in either direction, such means comprising a pair of gears concentric with the hub, a pair of pinions for each blade meshing respectively with said gears and with each other, and means for transmitting the movement of one of said pinions to the blade.

11. A propeller comprising a hub, a plurality of blades carried thereby, and mounted for rotation on their own axes, and means for so rotating said blades in either direction, such means comprising a pair of gears concentric with the hub, gearing connecting each of said gears with all of said blades, a pair of brake wheels rigid with said pair of gears, a brake band for each of said wheels having one end fixed, and a lever attached to the other ends of said bands, said lever being mounted for pivotal movement about its point of attachment to either band to tighten the other band.

12. The hereindescribed method of securing a wooden blade shank in a double tapered ferrule having a constricted middle portion, which consists in making the shank of double tapered form similar to the ferrule, and having an enlarged end, compressing such enlarged end and forcing it through the constricted portion of the ferrule, and then expanding such end to fill the tapered portion of the ferrule.

13. The hereindescribed method of securing a wooden blade shank in a double tapered ferrule having a constricted middle portion, which consists in making the shank of double tapered form similar to the ferrule, but with its smallest diameter larger than the constricted portion of the ferrule, and having an enlarged end, compressing such enlarged end and forcing it through the constricted portion of the ferrule, while compressing the smallest part of the shank to fit such constricted portion, and then expanding said enlarged end of the shank to fill the tapered portion of the ferrule.

14. In a propeller a double-tapered ferrule having a constricted portion, and a blade having a double tapered shank substantially filling said ferrule, with the material of the shank compressed where it lies within the constricted portion of the ferrule.

15. In a propeller construction, a shaft, a propeller hub mounted thereon, a plurality of ferrules rotatably mounted in said hub, a blade secured in each ferrule, a radial annular flange carried by each ferrule, gear teeth on said flange, and means for engaging said teeth and rotating said ferrules and blades, said means being arranged wholly externally of said shaft.

16. A propeller construction comprising a hub having a plurality of shallow sockets, a ferrule rotatably mounted in each of said sockets, a blade secured in each ferrule, a radial annular flange carried by each ferrule substantially at its inner end, said hub having two spaced integrally connected flanges surrounding each of said sockets and between which said first named flange is arranged and thrust bearings between said first named flange and the flanges on said hub.

17. A propeller construction comprising a shaft, a hub, a plurality of ferrules rotatably mounted on said hub, a blade secured in each ferrule, a gear wheel carried by each ferr' le, and gear mechanism for rotating said gear wheels, said gear mechanism being arranged rearwardly of the axes of said blades and externally of said shaft.

18. A propeller comprising a hub, a plurality of blades mounted thereon so as to be capable of rotation on their own axes, and means for so rotating said blade, said means comprising two separate sets of worms and worm wheels for each blade arranged in series, means for causing simultaneous rotation of each of said sets of worms and worm wheels in one direction, and other means for causing simultaneous rotation of each of said sets or worms and worm wheels in the opposite direction.

19. A propeller comprising a hub having a socket, a blade having a shank rotatable about its own axis in said socket, and means for so rotating said blade shank in either direction, said means comprising a pair of independent toothed gears journaled on said hub, a gear wheel meshing with one of said gears, and an idler pinion meshing with said gear wheel and the other of said gears.

20. The combination with a propeller having angularly adjustable blades, and means associated with each blade for angularly adjusting the same, of a pair of brake wheels normally rotating with the propeller, and operatively connected through reverse gearing with said adjusting means, a pair of brake bands for said wheels, a controlling lever to which one end of each brake band is secured, and a pair of spaced pivots about which said lever is mounted to swing for respectively tightening said brake bands.

21. The combination with a propeller having angularly adjustable blades, and means associated with each blade for angularly adjusting the same, of a pair of brake wheels normally rotating with the propeller, and operatively connected through reverse gearing with said adjusting means, a pair of brake bands for said wheels, a controlling lever to which one end of each brake band is secured at separated points, and a pair of spaced pivot pins about which said lever is mounted to selectively swing for tightening said respective brake bands.

22. The combination with a propeller having angularly adjustable blades, and means associated with each blade for angularly adjusting the same, of a pair of brake wheels normally rotating with the propeller, and operatively connected through reverse gearing with said adjusting means, a pair of brake bands for said wheels, a controlling lever, a pair of pivot pins carried by said lever at separated points, about either of which pivot pins the lever may swing, and one end of said brake bands being secured respectively to said pivot pins.

23. The combination with a propeller having angularly adjustable blades, and means associated with each blade for angularly adjusting the same, of a pair of brake wheels normally rotating with the propeller, and operatively connected through reverse gearing with said adjusting means, a pair of brake bands for said wheels, a controlling lever, guide plates between which said lever is freely mounted, a pair of spaced pivot pins carried by said lever, said guide plates having curved slots through which said pins freely work, each slot being formed on an arc of a circle of which the opposite pin is the center, and one end of said brake bands being secured to said lever at separated points, said lever being adapted to swing about either one pin or the other to selectively tighten said brake bands.

24. The combination with a propeller having angularly adjustable blades, of a pair of brake wheels for controlling said blades, a pair of brake bands cooperating with said wheels, a housing enclosing said brake wheels and bands, a crank case, brackets secured to said crank case and supporting said housing, and a controlling lever mounted on said housing and connected with the brake bands.

25. A propeller comprising a hub having a socket, a blade having a shank rotatable about its own axis in said socket, and means for so rotating said blade shank in either direction, said means comprising a pair of independent toothed gears journalled on said hub, coaxially thereof, a gear wheel and worm rigidly connected and rotatably supported on said hub, said worm being operatively connected with said blade shank, said gear wheel being in mesh with one of said toothed gears, and an idler pinion meshing with said last mentioned gear wheel and the other of said toothed gears.

In testimony whereof I hereunto affix my signature.

SPENCER HEATH.